United States Patent
Degawa et al.

(10) Patent No.: US 11,077,879 B2
(45) Date of Patent: Aug. 3, 2021

(54) VEHICLE TRAVEL CONTROL METHOD AND VEHICLE TRAVEL CONTROL DEVICE

(71) Applicant: Nissan Motor Co., Ltd., Yokohama (JP)

(72) Inventors: Katsuhiko Degawa, Kanagawa (JP); Takahiro Nojiri, Kanagawa (JP); Tatsuya Shino, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/630,995

(22) PCT Filed: Jul. 20, 2017

(86) PCT No.: PCT/JP2017/026284
§ 371 (c)(1),
(2) Date: Jan. 14, 2020

(87) PCT Pub. No.: WO2019/016917
PCT Pub. Date: Jan. 24, 2019

(65) Prior Publication Data
US 2020/0223483 A1   Jul. 16, 2020

(51) Int. Cl.
*B62D 15/02* (2006.01)
*B60K 35/00* (2006.01)
*B60Q 9/00* (2006.01)
*B60R 11/04* (2006.01)
*G06K 9/00* (2006.01)

(52) U.S. Cl.
CPC .......... *B62D 15/0255* (2013.01); *B60K 35/00* (2013.01); *B60Q 9/00* (2013.01); *B60R 11/04* (2013.01); *G06K 9/00798* (2013.01); *B60K 2370/152* (2019.05)

(58) Field of Classification Search
None
See application file for complete search history.

(56) References Cited

U.S. PATENT DOCUMENTS

| | | | |
|---|---|---|---|
| 2005/0021205 A1* | 1/2005 | Niwa | B60G 17/016 701/37 |
| 2009/0024321 A1 | 1/2009 | Bando et al. | |
| 2015/0070501 A1* | 3/2015 | Ooi | G08G 1/09626 348/148 |
| 2017/0153645 A1 | 6/2017 | Aoyagi | |
| 2017/0228717 A1* | 8/2017 | Rovik | G06Q 20/145 |

FOREIGN PATENT DOCUMENTS

| | | |
|---|---|---|
| DE | 102011087791 A1 | 6/2013 |
| JP | H5108916 A | 4/1993 |
| JP | 2004355145 A | 12/2004 |
| JP | 2013086580 A | 5/2013 |

(Continued)

*Primary Examiner* — Navid Ziaeianmehdizadeh
(74) *Attorney, Agent, or Firm* — Young Basile Hanlon & MacFarlane, P.C.

(57) ABSTRACT

A travel-lane determination unit determines whether a vehicle has entered a traffic lane on which a toll booth is provided. After it is determined that the vehicle has entered the traffic lane, a travel control unit pulls the vehicle to a position shifted from the center of the traffic lane toward the toll booth in a traffic-lane width direction, by the time when the vehicle reaches the toll booth.

11 Claims, 4 Drawing Sheets (56) References Cited

FOREIGN PATENT DOCUMENTS

| JP | 2013129328 A | 7/2013 |
| --- | --- | --- |
| JP | 2016222170 A | 12/2016 |
| JP | 2017054170 A | 3/2017 |
| JP | 2017065454 A | 4/2017 |
| JP | 2017-097695 A | 6/2017 |
| WO | 2016194960 A1 | 12/2016 |
| WO | 2017022474 A1 | 2/2017 |

* cited by examiner

VEHICLE TRAVEL CONTROL METHOD AND VEHICLE TRAVEL CONTROL DEVICE

TECHNICAL FIELD

The present invention relates to vehicle travel control methods and vehicle travel control devices.

BACKGROUND

A conventional technique has been disclosed in Japanese Patent Application Publication No. 2004-355145 which in the case where a vehicle is approaching an ETC (registered trademark), speed control is performed, and in the case where the vehicle is approaching a manned toll gate, the user is notified of disengagement of the speed control.

SUMMARY

The above technique is based on the assumption that for a manned toll gate, the driver steers the vehicle after the notification because the driver is notified of the disengagement of the speed control. Hence, if the driver does not steer the vehicle properly, the vehicle may not pull close enough to the manned toll gate, making it difficult to perform actions such as paying a fee.

The present invention has been made in light of the above problem, and an object thereof is to provide a vehicle travel control method and vehicle travel control device that are capable of pulling a vehicle to a toll booth provided on a traffic lane without the driver's steering.

A vehicle travel control method according to an aspect of the present invention includes, after it is determined that a vehicle has entered a traffic lane on which a toll booth is provided, pulling the vehicle to a position shifted from the center of the traffic lane toward the toll booth in a traffic-lane width direction, by the time when the vehicle reaches the toll booth.

The present invention makes it possible to pull a vehicle to a toll booth provided on a traffic lane without the driver's steering.

DETAILED DESCRIPTION

Next, an embodiment of the present invention will be described in detail with reference to the drawings. In the description, the same constituents will be denoted by the same symbols, and repetitive description thereof will be omitted.

Figure 1:
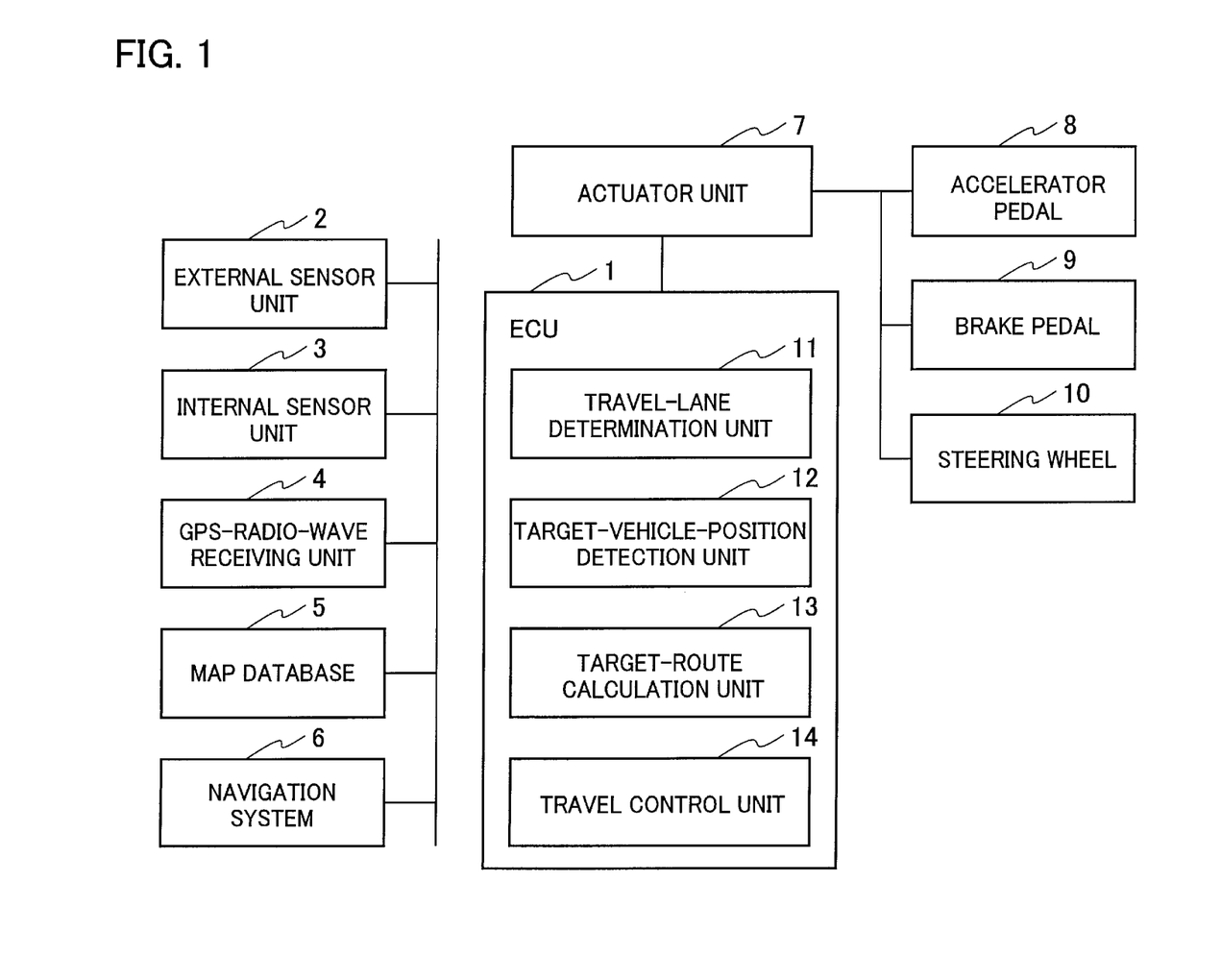
FIG. 1 is a functional block diagram illustrating part of a vehicle equipped with a vehicle travel control device according to an embodiment of the present invention.

As illustrated in FIG. 1, a vehicle includes an ECU (electronic control unit) 1, external sensor unit 2, internal sensor unit 3, GPS (Global Positioning System)-radio-wave receiving unit 4, map database 5, navigation system 6, actuator unit 7, accelerator pedal 8, brake pedal 9, and steering wheel 10. This vehicle is called the "host vehicle" to prevent this vehicle from being confused with other vehicles.

The ECU 1 corresponds to a vehicle travel control device that automatically steers a vehicle and can be implemented by using a microcomputer including a CPU (central processing unit), memory, and an input-output unit. A computer program that causes a microcomputer to function as the ECU 1 is installed into and executed by the microcomputer. This allows the microcomputer to function as the ECU 1. Note that although here an example in which the ECU 1 is implemented by software will be described, as a matter of course the ECU 1 can be implemented by dedicated hardware prepared for executing each information process to be described below.

The external sensor unit 2 includes a radar device or a camera (both not illustrated) and outputs, to the ECU 1, images or the positional information of objects around the host vehicle obtained from the radar device or camera. The camera also detects traffic lanes. The internal sensor unit 3 detects the operation amount of the accelerator pedal 8 (driving force), the operation amount of the brake pedal 9 (braking force), and the steering angle of the steering wheel 10 (steering amount) and outputs the detection results to the ECU 1.

The GPS-radio-wave receiving unit 4 obtains the position of the host vehicle by receiving radio waves from three or more GPS satellites and outputs the position to the ECU 1 and the navigation system 6.

The map database 5 includes map information of the areas where the host vehicle travels, and the ECU 1 and the navigation system 6 refer to the map information. The map information includes information on the positions or the like of roads, intersections, and toll booths provided on toll roads.

Information on toll booths includes information on traffic lanes provided with an "automatic toll gate" at which a vehicle can hand or receive fees and tickets by vehicle-road wireless communication without stopping (the automatic-toll-gate traffic lane) and information on traffic lanes provided with a "manual gate" at which vehicle stops temporarily for the occupants of the vehicles to hand or receive fees and tickets (manual-gate traffic lane). Here, as described above, traffic lanes on which an automatic toll gate is not provided are called "manual-gate traffic lanes". It can be understood that traffic lanes that are provided with an automatic toll gate which however is out of order and at which so a person needs to do actions such as receiving fees are regarded as manual-gate traffic lanes. It can also be understood that traffic lanes on which a manned toll booth is provided instead of an automatic toll gate are regarded as manual-gate traffic lanes. For a manual-gate traffic lane, a vehicle needs to stop at a toll booth for a person to hand or receive a fee and a ticket.

The information on a manual-gate traffic lane includes the position of the manual-gate traffic lane, the positions of the entrance and exit of the manual-gate traffic lane for vehicles, the traffic-lane width, and the length of the manual-gate traffic lane. Hereinafter, the entrance and exit of a manual-gate traffic lane for vehicles are simply called the entrance and exit of a manual-gate traffic lane.

The navigation system 6 guides the host vehicle to the destination set by an occupant such as the driver of the host vehicle. The navigation system 6, based on each piece of information outputted by the external sensor unit 2, the internal sensor unit 3, and the GPS-radio-wave receiving unit 4, calculates planned travelling roads to the destination and guides the host vehicle to the destination. The occupant sets whether to pass through manual gates or automatic toll gates, and based on this setting information, which gates to be passed through is set in the planned travelling roads. Note that gates may be automatically determined according to the state of the in-vehicle device (such as whether a card for passing through automatic toll gates is inserted).

The actuator unit 7 includes an actuator to change the operation amount of the accelerator pedal 8, an actuator to change the operation amount of the brake pedal 9, and an actuator to change the steering angle of the steering wheel 10. The actuator unit 7, for example, automatically performs steering control and braking-force control along a target route. The actuator unit 7 is also capable of steering the vehicle automatically based on traffic-lane information obtained by the camera of the external sensor unit 2 detecting traffic lanes.

The ECU 1 includes a travel-lane determination unit 11, target-vehicle-position detection unit 12, target-route calculation unit 13, and travel control unit 14, as functional constituents implemented by executing the computer program.

The travel-lane determination unit 11 determines whether the host vehicle has entered a manual-gate traffic lane, based on the position of the host vehicle and information on manual-gate traffic lanes. The target-vehicle-position detection unit 12 detects the position at which the host vehicle should be after the host vehicle pulls to a fee-collection apparatus on a manual-gate traffic lane into which fees can be thrown or a booth in which a person in charge of collecting fees is stationed. Hereinafter, apparatuses, booths, and the like at which vehicles stop as described above are collectively called "toll booths". The position at which the host vehicle should be after it pulls to the fee-collection apparatus or the booth is called the "target vehicle position".

The target vehicle position collectively includes what defines the position of the host vehicle in the traffic-lane width direction after the host vehicle pulls to the toll booth and before the host vehicle stops at the toll booth (hereinafter called the "target vehicle position 120") and what defines the position of the host vehicle in the traffic-lane length direction (travel direction) after the host vehicle pulls to the toll booth and before the host vehicle stops at the toll booth (hereinafter called the "target vehicle position 121"). In other words, the target vehicle position is a position of the host vehicle before the host vehicle stops at a toll booth after the host vehicle pulls to the toll booth. As described above, pulling the vehicle to the toll booth on the traffic lane includes moving the vehicle in the traffic-lane width direction closer to a toll booth provided on a traffic lane.

The target-route calculation unit 13 calculates a target route from the position of the host vehicle when it enters a manual-gate traffic lane to the target vehicle position. The travel control unit 14 automatically controls braking force, driving force, and steering amount, using the actuator unit 7 and thereby performs vehicle travel control of the host vehicle. The state where the travel control unit 14 is performing the vehicle travel control is called an "automated driving mode", and the state where the travel control unit 14 is not performing the vehicle travel control is called a "manual driving mode". In the manual driving mode, the driver needs to control steering, accelerating, and decelerating of the host vehicle by himself/herself.

Next, a vehicle travel control method performed by the ECU 1 will be described with reference to FIG. 2. Here, it is assumed that the travel control unit 14 is performing the vehicle travel control on the host vehicle according to the guidance of the navigation system 6 based on information on the planned travelling roads. In other words, it is assumed that the host vehicle is in the automated driving mode. The ECU 1 sequentially performs the vehicle travel control illustrated in the flowchart of FIG. 2.

Figure 2:
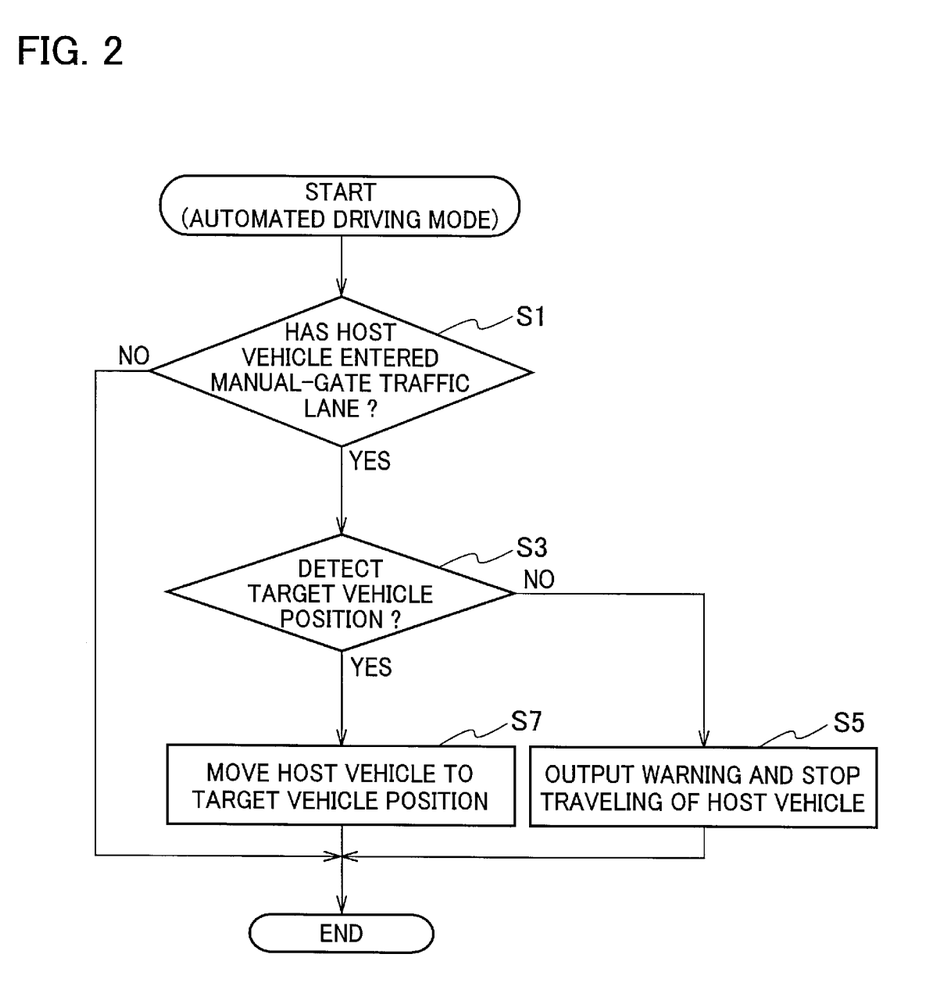
FIG. 2 is a flowchart for explaining a vehicle travel control method performed by an ECU 1.

As illustrated in FIG. 2, first, the travel-lane determination unit 11 determines the range of a manual-gate traffic lane based on the position of the manual-gate traffic lane, the traffic-lane width, and the length of the manual-gate traffic lane, and then determines whether the host vehicle has entered the manual-gate traffic lane by comparing the position of the host vehicle and the range of the manual-gate traffic lane (S1). In the case where the host vehicle has not entered the manual-gate traffic lane (NO at S1), the process ends.

Note that the travel-lane determination unit 11 may obtain information on the planned travelling road calculated by the navigation system 6 and determine whether the host vehicle has entered the manual-gate traffic lane on which the toll booth set in the planned travelling road is provided (S1).

In the case where the host vehicle has entered the manual-gate traffic lane (YES at S1) the target-vehicle-position detection unit 12 tries to obtain the target vehicle position based on the information outputted by the external sensor unit 2 and information on the manual-gate traffic lane (S3).

For example, there are cases where there is a fallen object or the like on the manual-gate traffic lane, and it is hard to pull the host vehicle to the toll booth, in other words, there are cases where the target vehicle position cannot be detected (NO at S3). In this case, the ECU 1 outputs a voice warning from the navigation system 6, such as "The vehicle cannot pull to the fee-collection apparatus. The vehicle will make an emergency stop.", and the travel control unit 14 controls the actuator unit 7 to immediately stop traveling of the host vehicle (S5), and then the process ends.

On the other hand, for example, in the case where there is no fallen object or the like, and the target vehicle position is able to be detected (YES at S3), the process proceeds to step S7.

At step S7, the ECU 1 outputs a voice message from the navigation system 6, such as "The vehicle will automatically pull to the fee-collection apparatus." and the travel control unit 14 controls the actuator unit 7 such that the host vehicle keeps traveling to move to the target vehicle position before the host vehicle reaches the toll booth (S7), and then the process ends.

As described above, the host vehicle automatically moves to the target vehicle position before the host vehicle reaches the toll booth, in other words, the host vehicle pulls to the toll booth, and thus the driver does not need to steer the host vehicle (no need to steer the handle), which reduces the burden on the driver. If the automatic travel control ends when the vehicle enters the manual-gate traffic lane, the driver needs to steer the vehicle to pull it to the toll booth. However, such steering is not necessary in this case.

At step S7, for example, the target-route calculation unit 13 calculates the target route from the position of the host vehicle when it enters the manual-gate traffic lane to the target vehicle position, and the travel control unit 14 controls the actuator unit 7 such that the host vehicle travels along the target route and moves to the target vehicle position. In other words, the travel control unit 14 automatically performs steering control and braking-force control along the target route.

In addition, at step S7, the occupant of the vehicle is notified in advance by a voice message as described above that such vehicle travel control will be performed. Note that the ECU 1 may display text or the like such as "The vehicle will automatically pull to the fee-collection apparatus." on the navigation system 6 to notify the occupant of the vehicle travel control. Since the occupant of the vehicle are notified in advance of the vehicle travel control as described above by a voice message or a display, the occupant of the vehicle can know in advance that the vehicle travel control will be performed. Thus, it is possible to reduce the mental burden of the occupant.

Next, the structure of a manual-gate traffic lane will be illustrated, and a vehicle travel control method in this embodiment will be described specifically.

Figure 3A:
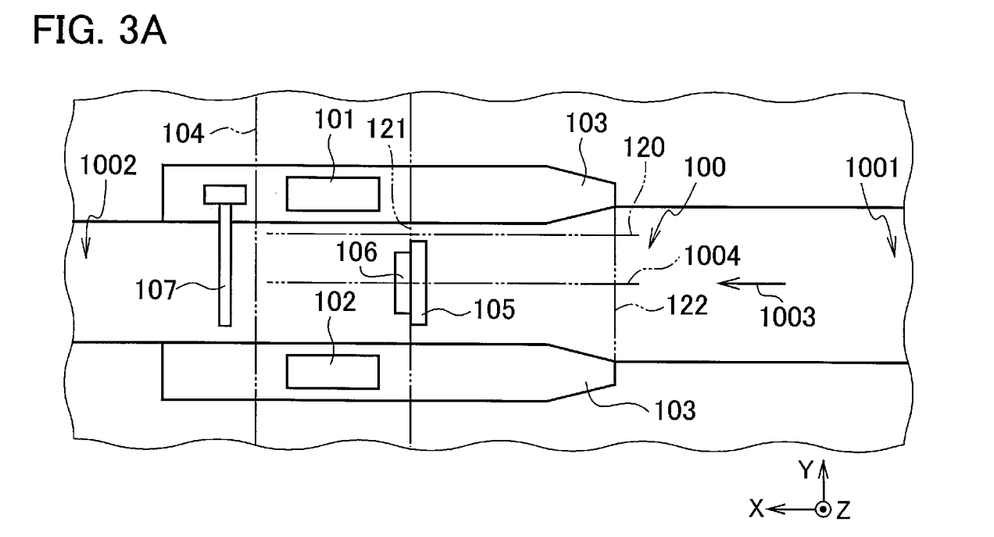
FIG. 3A is a plan view of an example of the structure of a manual-gate traffic lane and a target vehicle position.
Figure 3B:
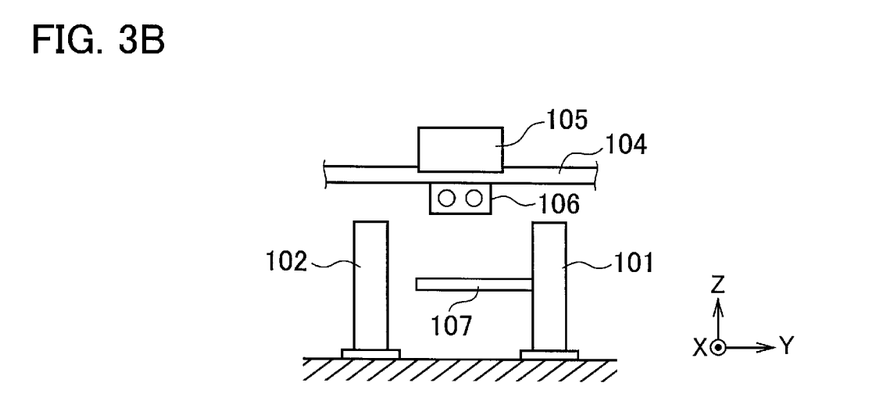
FIG. 3B is a front view of an example of the structure of the manual-gate traffic lane.
Figure 3C:
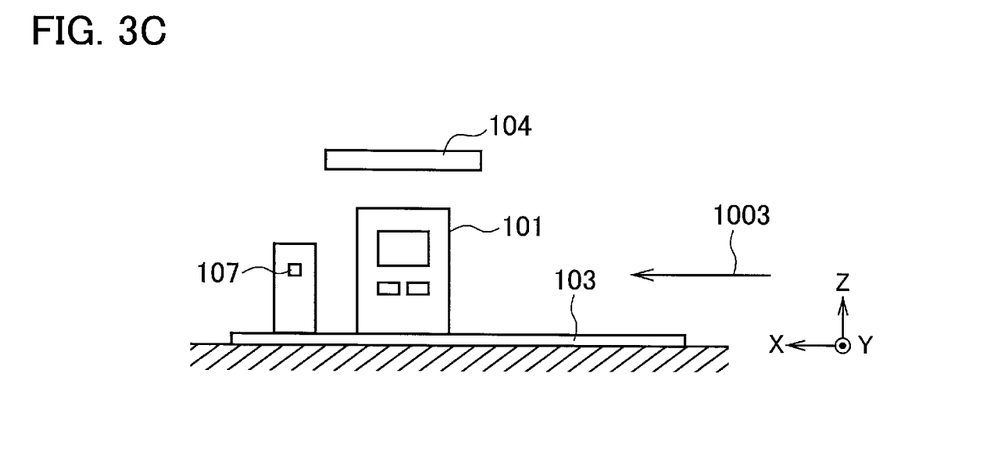
FIG. 3C is a side view of an example the structure of the manual-gate traffic lane.

As illustrated in FIGS. 3A, 3B, and 3C, there is a fee-collection apparatus 101, in other words, a toll booth at which vehicles' occupants perform actions such as paying fees, on a manual-gate traffic lane 100. Here, a toll booth means an apparatus or booth a position adjacent to which (on a side of the toll booth) vehicles are assumed to stop temporarily at. This definition is not dependent on whether there is staff or not and whether money is handled. The toll booths in this definition is not limited to ones for toll roads but include apparatuses or booths for managing the entry and exit of vehicles into and from parking lots or the like. The toll booths in this definition also include apparatuses that automatically issue tickets for entry and apparatuses including a card reader for authenticating drivers' cards for entry and exit. Note that in countries or regions where vehicles travel on the left-hand side of the road, the fee-collection apparatus 101 is positioned on the right side of the manual-gate traffic lane 100 as seen from the entrance 1001 of the manual-gate traffic lane 100, in other words, as seen toward the vehicle travel direction 1003. In FIGS. 3A, 3B, and 3C, viewing directions are indicated by X, Y, and Z.

Across the manual-gate traffic lane 100 from the fee-collection apparatus 101 is located a fee-collection apparatus 102 which is for a next manual-gate traffic lane. The fee-collection apparatuses 101 and 102 are on islands 103 which are one step higher than the manual-gate traffic lanes.

The fee-collection apparatuses 101 and 102 are examples of a "toll booth provided on a traffic lane", and a "toll booth provided on a traffic lane" means a toll booth provided to face a traffic lane so that vehicles travelling the traffic lane can perform actions to the toll booth. Vehicles traveling on the manual-gate traffic lane 100 can perform actions to the fee-collection apparatus 101. In other words, the fee-collection apparatus 101 is an example of a toll booth provided to face the manual-gate traffic lane 100 and is a toll booth adjoining to the manual-gate traffic lane 100. Vehicles traveling on the manual-gate traffic lane 100 cannot perform actions to the fee-collection apparatus 102. In other words, since the fee-collection apparatus 102 is not provided to face the manual-gate traffic lane 100, the fee-collection apparatus 102 is not a toll booth adjoining to the manual-gate traffic lane 100.

The fee-collection apparatuses 101 and 102 have a common roof 104 above them. A signboard 105 and a traffic signal 106 are attached to end portions of the roof 104 on the near side in the vehicle travel direction such that they can be seen from the near side in the vehicle travel direction. The signboard 105 and the traffic signal 106 are positioned, for example, at end portions of the roof 104 on the near side in the vehicle travel direction.

Near the exit 1002 of the manual-gate traffic lane 100 is located a stop bar 107. As illustrated in the figures, when the stop bar 107 is blocking the upper portion of the manual-gate traffic lane 100, vehicles cannot exit from the manual-gate traffic lane 100. When the stop bar 107 is not blocking the lane, vehicles can exit from the manual-gate traffic lane 100.

As illustrated in FIG. 3A, the target vehicle position 120 is set to a position shifted from the center 1004 of the traffic lane toward the fee-collection apparatus 101 in the traffic-lane width direction of the manual-gate traffic lane 100.

Since the fee-collection apparatus 101 is provided on an island 103, the target-vehicle-position detection unit 12 detects the island 103 by, for example, image-processing an image captured by the camera of the external sensor unit 2 and estimates the distance from the position of the host vehicle to the island 103. Then, the target-vehicle-position detection unit 12 sets the target vehicle position 120 based on the distance and the position of the host vehicle. The target-vehicle-position detection unit 12 may detect the traffic-lane width of the manual-gate traffic lane 100 from an image captured by the camera of the external sensor unit 2 and set the target vehicle position 120 based on the traffic-lane width and the position of the host vehicle.

Alternatively, for example, since the signboard 105 and the traffic signal 106 are positioned before the fee-collection apparatus 101 in the vehicle travel direction, the target vehicle position 121 is set to a position under the signboard 105 and the traffic signal 106. The target vehicle position 121 may be set to a position under the end of the roof 104 on the near side in the vehicle travel direction.

In this case, the target-vehicle-position detection unit 12, for example, detects an area of the signboard 105 or the like from an image ahead of the host vehicle captured by the camera of the external sensor unit 2 and measures the distance between the host vehicle and the signboard 105 or the like based on the change with time in the size of the detected area. The target-vehicle-position detection unit 12 sets the target vehicle position 121 based on the distance and the position of the host vehicle.

Note that the height of the signboard 105 or the like may be prestored, and the horizontal distance between the host vehicle and the signboard 105 or the like may be determined based on the distance determined from an image and the height.

The target-vehicle-position detection unit 12 sets a control start position 122 which serves as a guide to start the vehicle travel control at step S7. Since the end of the island 103 on the near side in the vehicle travel direction is positioned before target vehicle position 121 (under the signboard 105 and the traffic signal 106) in the vehicle travel direction, the control start position 122 is set, for example, to a side portion of the end of the island 103 on the near side in the vehicle travel direction.

In this case, in the same way as for the target vehicle position 121, the target-vehicle-position detection unit 12, for example, measures the distance between the host vehicle and the end of the island 103 on the near side in the vehicle travel direction from an image ahead of the host vehicle captured by the camera of the external sensor unit 2. The target-vehicle-position detection unit 12 sets the control start position 122 based on the distance and the position of the host vehicle.

Note that a highly accurate map storing the outlines of structures such as the signboard 105 and the island 103 may be held in advance. When the target vehicle positions 120 and 121 and the control start position 122 are detected, signals or an image obtained from the radar device or the camera of the external sensor unit 2 are compared with the highly accurate map, and the distance to the structures may be measured using the comparison results.

In addition, for the target vehicle positions 120 and 121 and the control start position 122, the positions obtained by appropriately offsetting the positions obtained by the detection may be used, instead of using them as is.

Figure 4A:
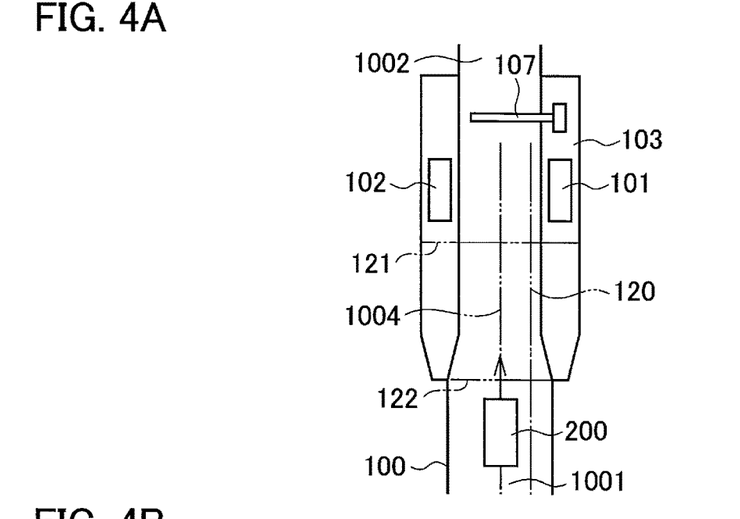
FIG. 4A is a plan view of an example of a state where a vehicle has entered a manual-gate traffic lane.

The host vehicle 200 illustrated in FIG. 4A has entered the manual-gate traffic lane 100. The target-vehicle-position detection unit 12 of this host vehicle 200 detects the target vehicle positions 120 and 121 from the position of the host vehicle 200.

Figure 4B:
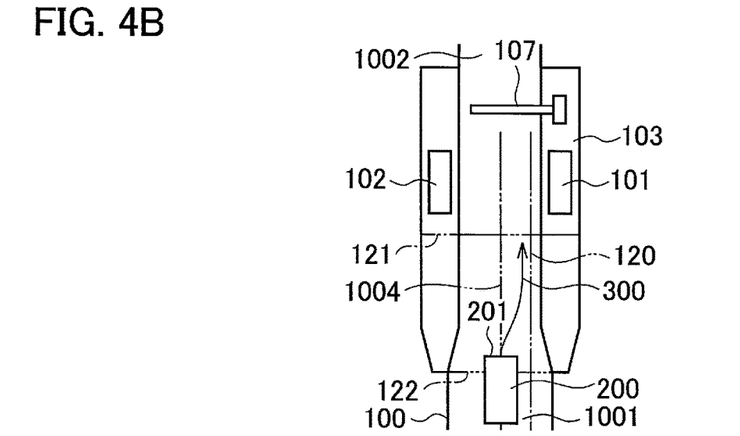
FIG. 4B is a plan view of an example of a target route along which the vehicle pulls to a fee-collection apparatus in the traffic-lane width direction.

Then, as illustrated in FIG. 4B, the target-route calculation unit 13 calculates a target route 300 from the position of the host vehicle 200, as the start point, to the position of the vehicle at which the side face 202 or the like of the host vehicle 200 is positioned at the target vehicle position 120 and the front end 201 or the like of the host vehicle 200 is positioned at the target vehicle position 121, in other words, to the target vehicle position. Note that the part of the host vehicle 200 adjusted to the target vehicle position 120 may be another part of the host vehicle 200 (for example, a wheel) instead of the front end 201. The part the host vehicle 200 adjusted to the target vehicle position 121 may be another part of the host vehicle 200 (for example, the center portion in the vehicle-width direction) instead of the side face 202.

Then, as illustrated in FIG. 4B, for example, after the front end 201 of the host vehicle 200 passes the control start position 122, the travel control unit 14 controls the actuator unit 7 to run the host vehicle 200 along the target route 300. Setting long the distance between the target vehicle position 121 and the control start position 122 enables travel without quick steering.

In the case where the target vehicle position 121 is set, for example, to a position in front of the fee-collection apparatus 101, instead of a position before the fee-collection apparatus 101 in the vehicle travel direction, the target route 300 involving quick steering needs to be calculated in some cases. In the present embodiment, since the target vehicle position 121 is set to a position before the fee-collection apparatus 101 in the vehicle travel direction as described above before calculating the target route 300, the target route 300 involving no quick steering can be calculated. In other words, it is possible to pull the host vehicle 200 to the fee-collection apparatus 101 at an appropriate timing.

The driver of the host vehicle 200, which has moved to the target vehicle positions 120 and 121, can move the host vehicle 200 just straight and stop the host vehicle 200 at the fee-collection apparatus 101 to perform actions such as paying a fee. When the driver does actions such as paying a toll fee, the stop bar 107 that has been blocking the manual-gate traffic lane 100 jumps up, and the host vehicle 200 can exit from the manual-gate traffic lane 100. Note that the travel control unit 14 may control the actuator unit 7 to automatically stop the host vehicle 200 in front of the fee-collection apparatus 101. In this case, the driver does not need to operate the brake pedal. A voice message or screen display may be used in front of the fee-collection apparatus 101 to prompt the driver to stop.

As has been described above, since the present embodiment makes it possible to pull the host vehicle 200 to a position shifted from the center of the traffic lane toward the toll booth, such as the fee-collection apparatus 101, in the traffic-lane width direction at an appropriate timing after the host vehicle 200 enters the manual-gate traffic lane 100, it is possible to reduce the burden on the driver's steering operation for manually pulling the host vehicle 200 to the toll booth. In other words, the present embodiment makes it possible to pull the host vehicle 200 to the toll booth without relying on the driver's steering operation in the manual-gate traffic lane 100.

Figure 4C:
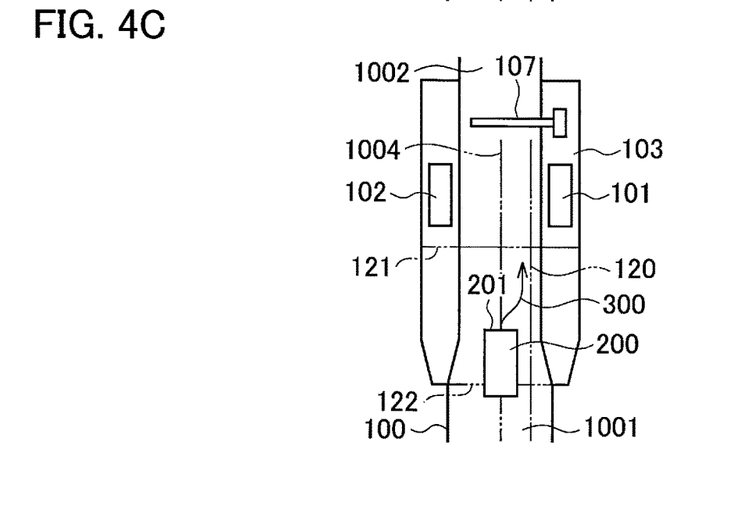
FIG. 4C is a plan view of another example of a target route along which the vehicle pulls to a fee-collection apparatus in the traffic-lane width direction.

Here, a preferred example of the target route 300 will be described. As illustrated in FIG. 4C, the target-route calculation unit 13 calculates the target route 300 such that the host vehicle 200 travels in the center 1004 in the traffic-lane width direction of the manual-gate traffic lane 100 before pulling to the toll booth, and the travel control unit 14 runs the host vehicle 200 along the target route 300.

If the host vehicle 200 does not travel in the center 1004, but the host vehicle 200 is pulled to the fee-collection apparatus 101 before entering the manual-gate traffic lane 100, it is highly possible that the vehicle speed at the timing is high and that the host vehicle 200 needs to be slowed down while being pulled to the fee-collection apparatus 101.

On the other hand, in the case where the host vehicle 200 travels in the center 1004 of the manual-gate traffic lane 100 in the traffic-lane width direction, deceleration of the host vehicle 200 is finished at the timing in many cases. Thus, it is possible to pull the host vehicle 200 to the fee-collection apparatus 101 while the host vehicle 200 is travelling at a low speed after the deceleration. This operation gives the driver less discomfort compared to the case where the host vehicle 200 does not travel in the center 1004.

For the vehicle travel control in which the host vehicle 200 travels in the center 1004 of the manual-gate traffic lane 100, it is also preferable that the driver be notified in advance that this control is for activities such as paying a toll fee or the like. This provides the effect that the driver can easily understand the vehicle travel control is for activities such as paying a toll fee.

Note that in the present embodiment, in the case where there is almost no possibility that the target vehicle positions 120 and 121 cannot be detected, the process may directly move to step S7 without performing step S3. In addition, although it is preferable to travel in the center 1004 of the manual-gate traffic lane 100 when moving to the target vehicle position, this is not essential. At step S7, it is not necessary to notify the occupant of the vehicle travel control in advance. In an alternative, the target vehicle position 121 in the travel direction is not set, but at step S7, the host vehicle is moved to only the target vehicle position 120 in the traffic-lane width direction.

Although in the present embodiment, the vehicle travel control device is mounted on the target vehicle on which the vehicle travel control is performed, the present invention is not limited to this example. The vehicle travel control device may be mounted on a server device communicable with the target vehicle or on a different vehicle which is not the target vehicle. Necessary information and instructions may be exchanged by the communication between the server device or different vehicle and the target vehicle to remotely perform the same or similar vehicle travel control method. The communication between the server device and the target vehicle can be executed by wireless communication or road-vehicle communication. The communication between the different vehicle and the target vehicle can be executed by what is called vehicle-to-vehicle communication.

Although an embodiment of the present invention has been described above, it should not be understood that the descriptions and drawings constituting part of this disclosure limit the invention. From this disclosure, various alternative embodiments, examples, and operational techniques will be apparent to those skilled in the art.

REFERENCE SIGNS LIST

1 ECU
2 external sensor unit
3 internal sensor unit
4 GPS-radio-wave receiving unit
5 map database
6 navigation system
7 actuator unit
8 accelerator pedal
9 brake pedal
10 steering wheel
11 travel-lane determination unit
12 target-vehicle-position detection unit
13 target-route calculation unit
14 travel control unit
100 manual-gate traffic lane
101, 102 fee-collection apparatus
103 island
104 roof
105 signboard
106 traffic signal
107 stop bar
120, 121 target vehicle position
122 control start position
200 host vehicle
201 front end of host vehicle
202 side face of host vehicle
300 target route
1001 entrance to manual-gate traffic lane
1002 exit from manual-gate traffic lane
1003 travel direction
1004 center of manual-gate traffic lane

The invention claimed is:

1. A vehicle travel control method for a vehicle travel control device that automatically steers a vehicle, comprising:
determining whether the vehicle has entered a traffic lane on which a toll booth is provided;
determining whether the toll booth is a manual-gate toll booth or an automatic-toll-gate;
and
in a case where the toll booth is the manual-gate toll booth, pulling the vehicle to a position within the traffic lane that is shifted from a center of the traffic lane toward the toll booth in a traffic-lane width direction, by the time when the vehicle reaches the toll booth.

2. The vehicle travel control method according to claim 1, further comprising:
stopping the vehicle at a position within the traffic lane before the toll booth in a travel direction of the vehicle.

3. The vehicle travel control method according to claim 1, further comprising:
setting a target vehicle position at which the vehicle is to be stopped to a position within the traffic lane before the toll booth in a travel direction of the vehicle;
calculating a target route within the traffic lane from the position of the vehicle at the time when the vehicle enters the traffic lane to the target vehicle position; and
performing steering control and braking-force control automatically along the target route.

4. The vehicle travel control method according to claim 3, wherein
the vehicle entering the traffic lane triggers the calculating the target route.

5. The vehicle travel control method according to claim 3, wherein
the target route is calculated such that the vehicle travels in the center in the traffic-lane width direction of the traffic lane before the vehicle pulls to the toll booth.

6. The vehicle travel control method according to claim 5, wherein
the vehicle travels in the center in the traffic-lane width direction of the traffic lane, and after the vehicle decelerates, the vehicle pulls to the toll booth.

7. The vehicle travel control method according to claim 1, further comprising:
notifying an occupant of the vehicle in advance that the vehicle is going to pull to the toll booth.

8. The vehicle travel control method according to claim 1, further comprising:
in a case where the traffic lane with the manual-gate toll booth appears obstructed, prompting, by sound or display, an occupant of the vehicle that the vehicle will stop at a position before the toll booth before pulling the vehicle into the position.

9. The vehicle travel control method according to claim 1, further comprising:
in a case where the vehicle is not going to be pulled to the toll booth, notifying an occupant of the vehicle that the vehicle is not going to be pulled to the toll booth.

10. The vehicle travel control method according to claim 1, further comprising:
in a case where the toll booth is the automatic-toll-gate, the vehicle travels in the center of the traffic lane.

11. A vehicle travel control device which comprises a camera that detects traffic lanes and an actuator that steers a vehicle automatically based on traffic-lane information, the device further comprising an electronic control unit configured to:
determine whether the vehicle has entered a traffic lane on which a toll booth is provided;
determine whether the toll booth is a manual-gate toll booth or an automatic-toll-gate,
and
in a case where the toll booth is the manual-gate toll booth, control travel of the vehicle to a position within the traffic lane that is shifted from a center of the traffic lane toward the toll booth in a traffic-lane width direction.

* * * * *